United States Patent
Lee et al.

(10) Patent No.: US 11,529,960 B2
(45) Date of Patent: Dec. 20, 2022

(54) METHOD AND APPARATUS FOR DETECTING DRIVER'S ABNORMALITIES BASED ON MACHINE LEARNING USING VEHICLE CAN BUS SIGNAL

(71) Applicants: Penta Security Systems Inc., Seoul (KR); AUTOCRYPT CO., LTD., Seoul (KR)

(72) Inventors: Seok Woo Lee, Seoul (KR); Duk Soo Kim, Seoul (KR); Eui Seok Kim, Seoul (KR); Sang Gyoo Sim, Seoul (KR); Seung Young Park, Chuncheon-si (KR)

(73) Assignees: PENTA SECURITY SYSTEMS INC., Seoul (KR); AUTOCRYPT CO., LTD., Seoul (KR)

( * ) Notice: Subject to any disclaimer, the term of this patent is extended or adjusted under 35 U.S.C. 154(b) by 399 days.

(21) Appl. No.: 16/690,070

(22) Filed: Nov. 20, 2019

(65) Prior Publication Data
US 2021/0094553 A1    Apr. 1, 2021

(30) Foreign Application Priority Data
Sep. 26, 2019   (KR) .................. 10-2019-0118628

(51) Int. Cl.
*B60W 40/09*        (2012.01)
*G06N 3/08*         (2006.01)
(Continued)

(52) U.S. Cl.
CPC .......... *B60W 40/09* (2013.01); *B60R 16/0231* (2013.01); *G06N 3/08* (2013.01);
(Continued)

(58) Field of Classification Search
CPC ....... B60W 40/09; G06V 20/597; G06N 3/08; B60R 16/0231; H04L 12/40; H04L 2012/40215; H04L 2012/40273
See application file for complete search history.

(56) References Cited

U.S. PATENT DOCUMENTS 4,741,163 A * 5/1988 Hidaka .................. F02B 37/22
                                                    60/602
8,306,931 B1 * 11/2012 Bowman .............. G06N 3/0454
                                                    706/26
(Continued)

FOREIGN PATENT DOCUMENTS

CN      105139070 A  * 12/2015
CN      108710865 A  * 10/2018 ......... G06K 9/00845
(Continued)

OTHER PUBLICATIONS

Hu et al. "Abnormal Driving Detection Based on Normalized Driving Behavior" published Aug. 2017 and retrieved from https://ieeexplore.ieee.org/stamp/stamp.jsp?arnumber=7835684 (Year: 2017).*
(Continued)

*Primary Examiner* — Calvin Cheung
(74) *Attorney, Agent, or Firm* — Goldilocks Zone IP Law

(57) ABSTRACT

Provided is a method for detecting a driver's abnormalities based on a CAN (Controller Area Network) bus network communicating with an ECU (Electronic Control Unit) of a vehicle. The method may include: acquiring a CAN bus signal related to an operation of the vehicle from the CAN bus network; extracting a detection vector from the CAN bus signal using an auto encoder; and detecting a driver's abnormality based on the detection vector.

12 Claims, 7 Drawing Sheets

(51) Int. Cl.
*H04L 12/40* (2006.01)
*B60R 16/023* (2006.01)
*G06V 20/59* (2022.01)

(52) U.S. Cl.
CPC ............ *G06V 20/597* (2022.01); *H04L 12/40* (2013.01); *H04L 2012/40215* (2013.01); *H04L 2012/40273* (2013.01)

(56) References Cited

U.S. PATENT DOCUMENTS

| | | | | |
|---|---|---|---|---|
| 9,925,987 | B1* | 3/2018 | Nguyen | ............... G08G 1/0129 |
| 2007/0120334 | A1* | 5/2007 | Holbrook | ............. B60G 17/016 |
| | | | | 280/5.514 |
| 2017/0278323 | A1* | 9/2017 | Gupta | ..................... G06F 21/50 |
| 2018/0164825 | A1* | 6/2018 | Matus | ................... G05D 1/0214 |
| 2019/0001964 | A1* | 1/2019 | Lin | ....................... B60W 50/04 |
| 2019/0311272 | A1* | 10/2019 | Kamata | ............. B60W 50/0097 |

FOREIGN PATENT DOCUMENTS

| | | | | | |
|---|---|---|---|---|---|
| CN | 109034134 | A | * | 12/2018 | ......... G06K 9/00228 |
| CN | 109726771 | A | * | 5/2019 | |
| CN | 110334592 | A | * | 10/2019 | |
| DE | 102016116068 | A1 | * | 3/2017 | ............ B60W 40/09 |
| JP | 2019-49778 | A | | 3/2019 | |

OTHER PUBLICATIONS

Matthias Matousek et al., Detecting Anomalous Driving Behavior using Neural Networks, 2019 IEEE Intelligent Vehicles Symposium (IV), Jun. 9-12, 2019, pp. 2229-2235.

Tetsuro Morimoto et al., Analysis of time series data to discover the influence of driving conditions of automobile from driver fatigue, DEIM Forum 2016 H8-1, pp. 1-6.

Vidyasagar Sadhu et al., Deep Multi-Task Learning for Anomalous Driving Detection Using CAN Bus Scalar Sensor Data, Jun. 28, 2019, pp. 1-8, Department of ECE, Rutgers University-New Brunswick, NJ; *Honda Research Institute, Mountain View, CA.

Fumiya Kudo et al., Inspection of defect of industrial products using convolutional autoencoder, Technical Committee on Artificial Intelligence and Knowledge-Based Processing / Special Interest Group on Intelligence and Complex Systems/ Special Interest Group on Knowledge-Based Systems/ Special Interest Group on Data Oriented Constructive Mining and Simulation/ Special Interest Group on Society and Artificial Intelligence, Mar. 2, 2019, pp. 1-12.

* cited by examiner

Original Space

Feature Space

METHOD AND APPARATUS FOR DETECTING DRIVER'S ABNORMALITIES BASED ON MACHINE LEARNING USING VEHICLE CAN BUS SIGNAL

CROSS-REFERENCE TO RELATED APPLICATIONS

This application claims the priority of Korean Patent Application No. 10-2019-0118628, filed on Sep. 26, 2019, and all the benefits accruing therefrom under 35 U.S.C. § 119, the contents of which in its entirety are herein incorporated by reference.

BACKGROUND

1. Technical Field

The present disclosure relates to a method and apparatus for detecting a driver's abnormalities, and more particularly, to a method and apparatus for detecting a driver's abnormalities based on an MSE (Mean Square Error) calculated for each vehicle CAN (Controller Area Network) bus signal by an auto encoder.

2. Related Art

Machine learning is a kind of artificial intelligence (AI), and indicates that a computer performs a prediction operation such as regression, classification and clustering, based on contents that the computer has learned based on data.

Deep learning is one field of the machine learning, which teaches a computer how people think, and may be defined as a set of machine learning algorithms that attempt high-level abstractions through a combination of various nonlinear transformation techniques. The abstraction refers to an operation of abstracting core contents or functions in big data or complex data.

The deep learning structure is designed based on ANN (Artificial Neural Networks). The ANN refers to an algorithm that mathematically models virtual neurons and then simulates the modeled virtual neutrons to have a learning ability like a human brain, and is mainly used for pattern recognition. The ANN model used in the deep learning has a structure in which linear fittings and nonlinear transformations or activations are repeatedly stacked. Examples of the ANN model used in the deep learning may include a DNN (Deep Neural Network), CNN (Convolutional Neural Network), RNN (Recurrent Neural Network), RBM (Restricted Boltzmann Machine), DBN (Deep Belief Network), deep Q-networks and the like.

Driver state detection technology refers to a technology that detects a driver's fatigue, sleepiness, bad condition or intoxication in advance, and issues a warning to the driver or helps the driver to avoid a dangerous situation.

Driver identification technology refer to a technology that identifies a driver's driving characteristics at normal times, and automatically files a theft report to an insurance company or the like when an unauthorized driver operates the vehicle, in order to prevent a vehicle theft.

For example, a related art discloses a technology that detects the open state of a driver's eyes and the direction of the driver's face through a driver monitor installed in a vehicle, and displays a warning sign on the instrument panel with a warning sound or operates a brake system when it is determined that the driver is drowsing or looking out of the corner of his/her eye. Furthermore, there is a technology that detects a driver's fatigue from a steering operation or accelerator/brake operation, using a steering angle sensor or the like mounted in a vehicle. In addition, there is a technology that detects sound vibrations of a driver's blood vessels through a device which is installed in the back of a driver seat to detect a body surface pulse wave.

However, the technologies, which detect a driver's inoperable condition such as driving while drowsy and drunk driving or detect whether an unauthorized driver operates a vehicle instead of a driver who operates the vehicle at normal times, by recognizing the driver's bio-signals such as blinking, pupil action, cardiac impulse, blood pressure and body temperature, have a limited bio-signal recognition rate and thus have a limitation in reliably detecting the driver.

Furthermore, the technologies that detect whether an unauthorized driver operates a vehicle instead of a driver who operates the vehicle at normal times may generate statistics for fuel efficiency or average speed when the driver who operates the vehicle at normal times operates the vehicle, and detect whether an unauthorized driver operates the vehicle instead of the vehicle owner, based on the statistics. However, when a vehicle theft occurs, the technologies according to the related arts cannot immediately generate the statistics for fuel efficiency or average speed of the vehicle. Only after a vehicle is operated for quite a long time, the statistics can be generated.

SUMMARY

Various embodiments are directed to a method that analyzes a CAN (Controller Area Network) bus signal of a vehicle based on a driver's driving habits such as a driving habit of changing lanes or operating a steering device on a curved road and a driving habit of operating an acceleration control device and a braking device depending on a distance from a forward vehicle, and detects the driver's state and determines whether an unauthorized driver drives the vehicle, instead of the driver who drives the vehicle at normal times.

In an embodiment, there is provided a method for detecting a driver's abnormalities based on a CAN bus network communicating with an ECU (Electronic Control Unit) of a vehicle. The method may include: acquiring a CAN bus signal related to an operation of the vehicle from the CAN bus network; extracting a detection vector from the CAN bus signal using an auto encoder; and detecting a driver's abnormality based on the detection vector.

The detection vector may be extracted through an MSE (Mean Square Error) calculated for each CAN bus signal by the auto encoder.

The MSE may be minimized by adjusting parameters constituting the auto encoder.

The detecting of the driver's abnormality based on the detection vector may include detecting the driver's abnormality through an abnormality detection model based on unsupervised learning.

The detecting of the driver's abnormality through the abnormality detection model based on the unsupervised learning may include detecting the driver's abnormality by extracting an anomaly score for a predetermined time.

The detecting of the driver's abnormality by extracting the anomaly score for the predetermined time may include detecting the driver's abnormality based on the number of times that the anomaly score exceeds a first threshold related to the driver's abnormality for the predetermined time.

The detecting of the driver's abnormality by extracting the anomaly score for the predetermined time may include detecting the driver's abnormality by measuring a fluctuation in anomaly score over time, which exceeds a second threshold related to the driver's abnormality, for the predetermined time.

In an embodiment, there is provided an apparatus for detecting a driver's abnormalities based on a CAN bus network communicating with an ECU of a vehicle. The apparatus may include: a processor; and a memory configured to store one or more commands executed through the processor. The one or more commands may include: a command for controlling the driver abnormality detection apparatus to acquire a CAN bus signal related to an operation of the vehicle from the CAN bus network; a command for controlling the driver abnormality detection apparatus to extract a detection vector from the CAN bus signal using an auto encoder; and a command for controlling the driver abnormality detection apparatus to detect a driver's abnormality based on the detection vector.

The detection vector may be extracted through an MSE calculated for each CAN bus signal by the auto encoder.

The MSE may be minimized by adjusting parameters constituting the auto encoder.

The command for controlling the driver abnormality detection apparatus to detect the driver's abnormality based on the detection vector may include a command for controlling the driver abnormality detection apparatus to detect the driver's abnormality through an abnormality detection model based on unsupervised learning.

The command for controlling the driver abnormality detection apparatus to detect the driver's abnormality through the abnormality detection model based on the unsupervised learning may include a command for controlling the driver abnormality detection apparatus to detect the driver's abnormality by extracting an anomaly score for a predetermined time.

The command for controlling the driver abnormality detection apparatus to detect the driver's abnormality by extracting the anomaly score for the predetermined time may include a command for controlling the driver abnormality detection apparatus to detect the driver's abnormality based on the number of times that the anomaly score exceeds a first threshold related to the driver's abnormality for the predetermined time.

The command for controlling the driver abnormality detection apparatus to detect the driver's abnormality by extracting the anomaly score for the predetermined time may include a command for controlling the driver abnormality detection apparatus to detect the driver's abnormality by measuring a fluctuation in anomaly score over time, which exceeds a second threshold related to the driver's abnormality, for the predetermined time.

In accordance with the embodiments of the present disclosure, it is possible to provide a method which can analyze a driver's habits based on a CAN bus signal, and detect a driver's abnormalities without additional equipment for recognizing bio-signals.

DETAILED DESCRIPTION

Figure 1:
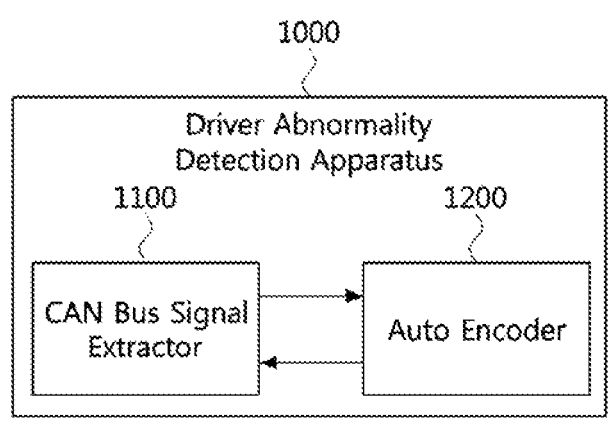
FIG. 1 is a block diagram for describing an apparatus for detecting a driver's abnormalities in accordance with an embodiment of the present disclosure.

The present disclosure can be modified in various manners and embodied in various manners, and specific embodiments will be illustrated in the drawings and described in detail in the detailed description. However, the present disclosure is not limited to the specific embodiments, but may include all modifications, equivalents and substitutions without departing from the technical spirit and scope of the present disclosure. While the respective drawings are described, like components are represented by like reference numerals.

The terms such as first, second, A and B may be used to describe various components, but the components should not be limited by the terms. The terms are used only to distinguish one component from another component. For example, a first component may be referred to as a second component without departing from the scope of the present disclosure. Similarly, the second component may also be referred to as the first component. The term "and/or" includes a combination of a plurality of related described items or any one of a plurality of related described items.

When a certain component is referred to as being "coupled" or "connected" to another component, it may not only indicate that the former component is directly coupled or connected to the latter component, but also indicate that another component is present between the former component and the latter component. On the other hand, when a certain component is "directly coupled" or "directly connected" to another component, it may indicate that no component is present between the former component and the latter component.

The terms used in this application are only used to describe a specific embodiment, and not intended to limit the present disclosure. The terms of a singular form may include plural forms unless otherwise specified. In this specification, the meaning of "include" or "have" specifies the presence of a property, a number, a step, a process, an element, a component, or combinations thereof, but does not exclude in advance the possibility of presence or addition of one or more other properties, numbers, steps, processes, elements, components, or combinations thereof.

All terms used herein, which include technical or scientific terms, may have the same meanings as those generally understood by those skilled in the art to which the present disclosure pertains, unless otherwise defined. The terms defined in a generally used dictionary should be interpreted to have meanings which coincide with contextual meanings in the related art. As long as the terms are not clearly defined in this specification, the terms should not be interpreted as ideal or excessively formal meanings.

Hereafter, exemplary embodiments of the present disclosure will be described in detail with reference to the accompanying drawings.

FIG. 1 is a block diagram for describing an apparatus for detecting a driver's abnormalities in accordance with an embodiment of the present disclosure.

Referring to FIG. 1, the apparatus for detecting a driver's abnormalities (hereafter, referred to as the driver abnormality detection apparatus) 1000 in accordance with the embodiment of the present disclosure may include a CAN (Controller Area Network) bus signal extractor 1100 and an auto encoder 1200.

The CAN bus signal extractor 1100 may acquire a CAN bus signal from a CAN bus network. The CAN bus signal may be exchanged through the CAN bus network for communication with an ECU (Electronic Control Unit) within a vehicle.

The auto encoder 1200 may include deep learning models such as an LSTM (Long Short Term Memory), an RNN (Recurrent Neural Network) and a GRU (Gated Recurrent Unit), and extract an MSE (Mean Square Error) of the CAN bus signal acquired through the CAN bus signal extractor 1100.

Figure 2:
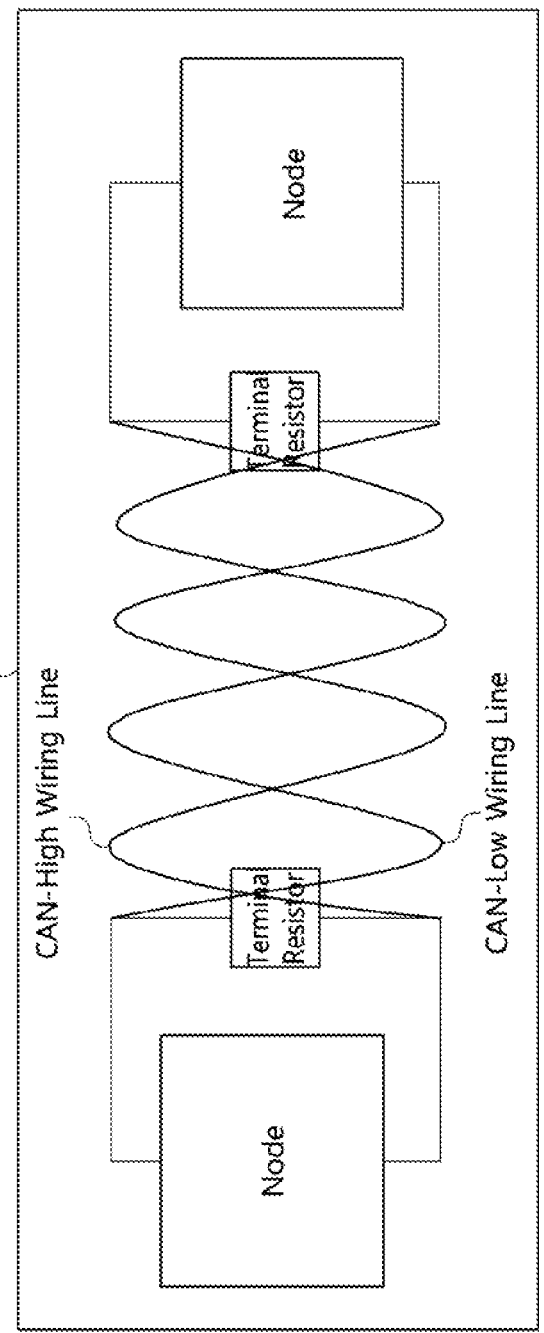
FIG. 2 is a diagram for describing a CAN (Controller Area Network) bus signal extractor 1100.

FIG. 2 is a block diagram for describing the CAN bus signal extractor 1100.

The CAN may indicate a network system for a vehicle, which provides digital serial communication among various pieces of instrument and control equipment in the vehicle. Furthermore, complex electrical wirings and relays of electronic parts within the vehicle may be replaced with serial communication lines and intellectualized to reduce the weight and complexity thereof while satisfying real-time requests in the vehicle. Furthermore, the CAN may diagnose whether abnormalities of the vehicle occur due to electronic interference, and organically communicate with the vehicle in case of an unexpected situation during driving.

Referring to FIG. 2, the CAN bus signal extractor 1100 may include at least two nodes, a CAN-low wiring line, a CAN-high wiring line and at least two terminal resistors.

The nodes may indicate a plurality of stations constituting a bus system. For example, the node may indicate the ECU configured to control the engine, automatic transmission, ABS and the like of the vehicle using a computer.

When a dominant level is formed in the CAN-high wiring line by transceivers of the nodes, the voltage of the CAN-high wiring line may rise, and simultaneously the voltage of the CAN-low wiring line may fall.

The terminal resistor may couple a circuit between the CAN-high wiring line and the CAN-low wiring line, and prevent an occurrence of reflection in the CAN bus wiring line.

While information is not being transmitted/received through the bus wiring line, each node in the CAN may transmit a message to the bus wiring line according to the multi-master principle. Furthermore, when a plurality of ECUs are intended to transmit messages at the same time, the most important message may be first transmitted through arbitration.

Figure 3:
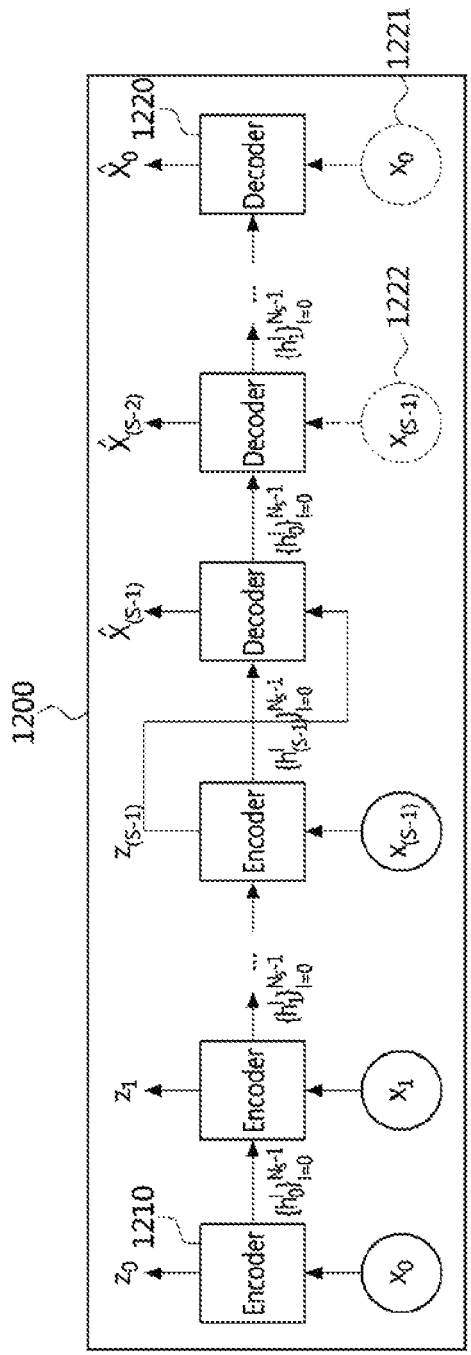
FIG. 3 is a block diagram for describing an auto encoder 1200 based on an LSTM (Long Short Term Memory).

FIG. 3 is a block diagram for describing the auto encoder 1200 based on the LSTM.

Referring to FIG. 3, the auto encoder 1200 may include an encoder 1210 and a decoder 1220. FIG. 3 illustrates a plurality of encoders and a plurality of decoders. However, this configuration is only an example for describing repeated operations of the plurality of encoders and decoders, and the plurality of encoders and decoders may be the same encoders and decoders.

The auto encoder may indicate a device that makes output data similar to input data, and performs learning to reproduce itself. That is, the auto encoder may be attached to a decoder at the next stage, in order to determine whether input and output are equal to each other. Therefore, since the output data becomes true data, the true data does not need to be prepared, and the learning may be classified into unsupervised learning.

Here, $x_t$ may represent a CAN bus signal vector inputted to an encoder of the auto encoder at a specific time t, and $\hat{x}_t$ may represent a CAN bus signal vector recovered and outputted by a decoder of the auto encoder.

Furthermore, $z_t$ may represent a CAN bus signal vector outputted by the CAN bus signal vector $x_t$ inputted to the encoder of the auto encoder, and $h^l_t$ may represent a hidden state vector of an $l^{th}$ LSTM layer at the specific time t. Furthermore, S may represent the length of a sequence, and $N_s$ may represent the number of LSTM layers constituting each of the encoders and decoders of the auto encoder.

The encoder 1210 may indicate a converter for converting a signal into another signal in an electronic circuit. In the present embodiment, the encoder 1210 may perform a function of compressing input data inputted to the auto encoder. The decoder 1220 may indicate a converter for converting an encoded signal into another signal. In the present embodiment, the decoder 1220 may perform a function of generating output data outputted from the auto encoder.

An auto encoder which inputs input data at an immediate next time (t=n+1) to a decoder in order to recover data at the current time (t=n) may be referred to as a conditional auto encoder. That is, the conditional auto encoder may invert time-series input data, and input time inverse input data to the decoder. For example, when the current time is 0 (t=0) as illustrated in FIG. 3, the conditional auto encoder may input data 1221 at the immediate next time (t=1) to the decoder, in order to recover data at the current time. Similarly, when the current time is S−2 (t=S−2), the conditional auto encoder may input data 1222 at the immediate next time (t=S−1) to the decoder in order to recover data at the current time.

Furthermore, an auto encoder which inputs output data generated by the decoder at an immediate previous time as input data to the decoder, instead of the input data at the immediate next time (t=n+1), in order to recover the data at the current time (t=n), may be referred to as an unconditional auto encoder. For example, when the current time is 0 (t=0) as illustrated in FIG. 3, the unconditional auto encoder may input $\hat{x}_1$ as input data to the decoder, instead of the input data 1221 at the immediate next time, in order to recover the data at the current time. Similarly, when the current time is S−2 (t=S−2), the unconditional auto encoder may input $\hat{x}(S-1)$ as input data to the decoder, instead of the input data 1222 at the immediate next time, in order to recover the data at the current time.

FIG. 3 illustrates the auto encoder based on the LSTM. However, the auto encoder 1200 may be configured as an auto encoder based on a deep learning model such as an RNN and a GRU.

Figure 4:
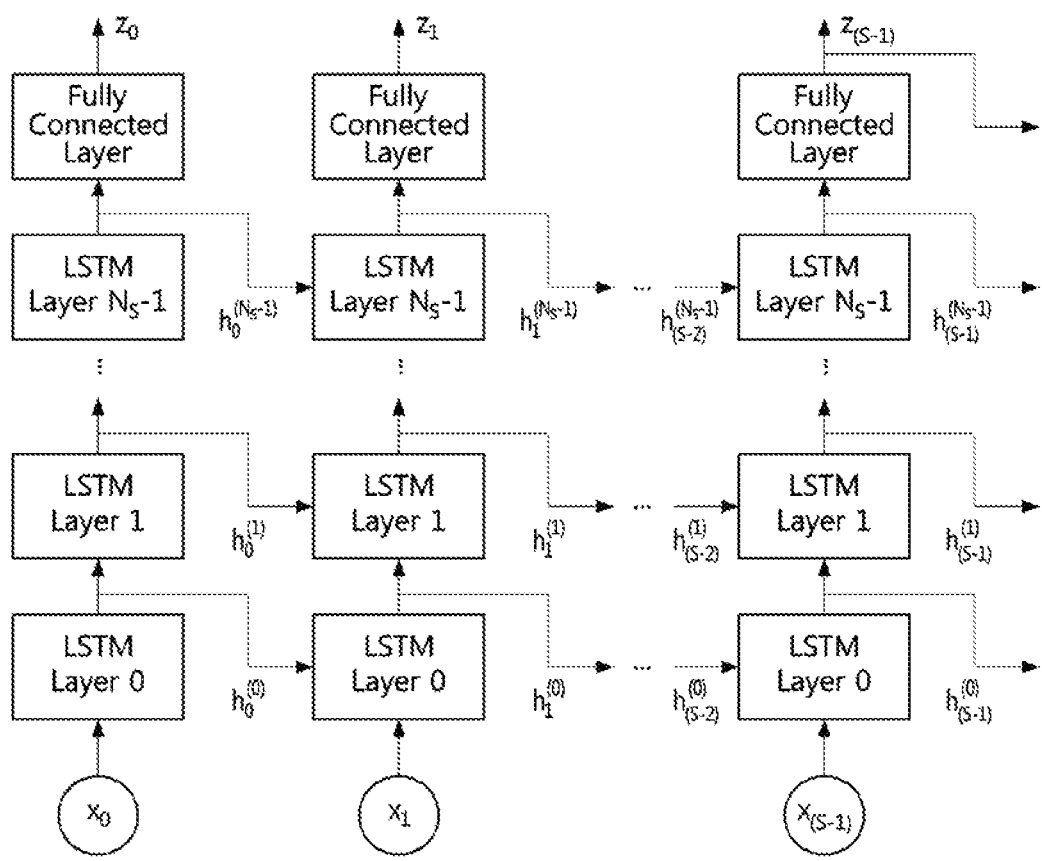
FIG. 4 is a diagram for describing a flow of a CAN bus signal generated by the auto encoder 1200.
Figure 5:
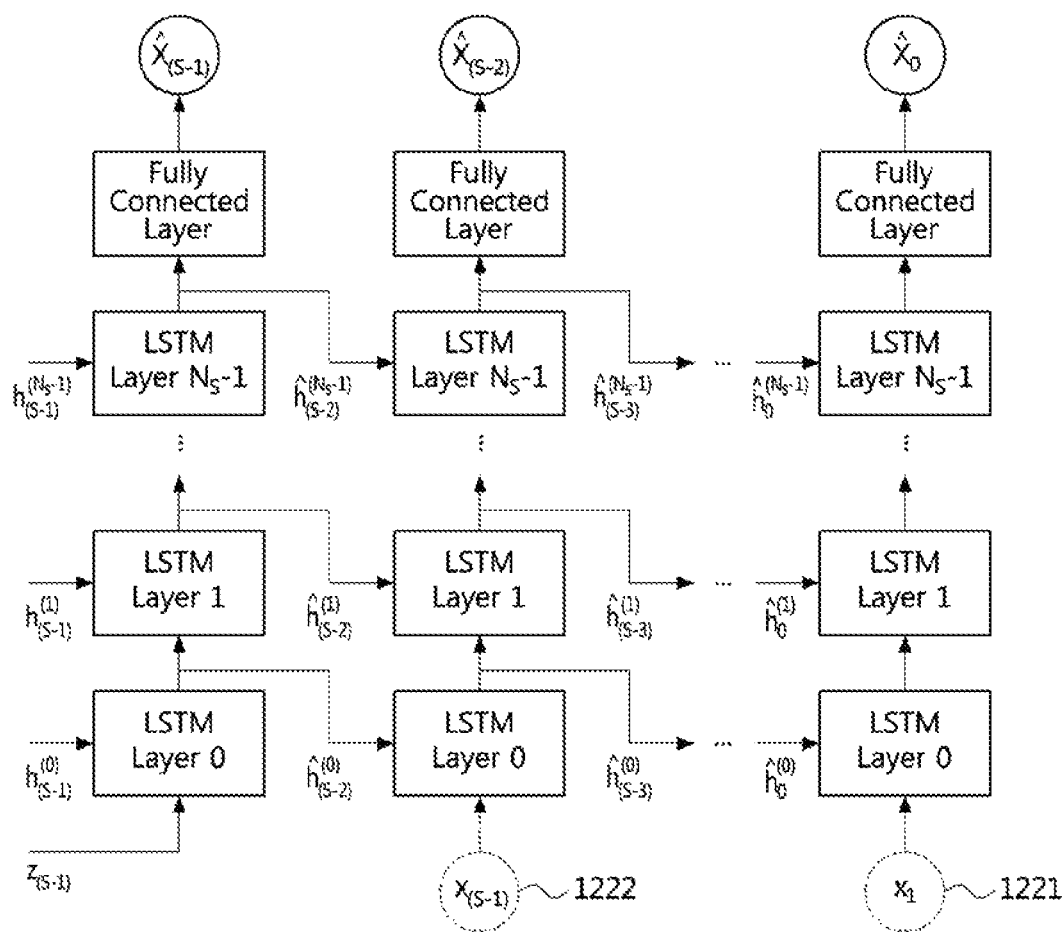
FIG. 5 is a diagram for describing a flow of a CAN bus signal generated by the auto encoder 1200.

FIGS. 4 and 5 are diagrams for describing a flow of a CAN bus signal generated by the auto encoder 1200.

Referring to FIGS. 4 and 5, each of the encoders and decoders may include LSTM layers and a fully connected layer. The fully connected layer may indicate a layer coupled to all neurons of the previous layer. The auto encoder may output a new hidden state vector $h^l_t$ using an input $x_t$ and a previous hidden state vector $h^l_{t-1}$, and input the input $x_t$ in a time-series manner based on the number of encoders which are designed in consideration of the length of the sequence, thereby outputting a hidden state vector h over time.

The decoder may receive a CAN bus signal vector outputted from itself as an input value, and receive CAN bus signal vectors at the immediate next time as input values 1221 and 1222. The decoder may receive the CAN bus signal vectors 1221 and 1222 at the immediate previous time as input values. At this time, the auto encoder including the decoder which receives the CAN bus signal vectors at the immediate next time as input data may be referred to as a conditional auto encoder, and the auto encoder including the decoder which receives the recovered signal vector outputted from the decoder as input data may be referred to as an unconditional auto encoder.

Equation 1 is an equation for extracting an MSE (Mean Square Error) for a CAN bus signal.

$$MSE = \frac{1}{S}\sum_{t=0}^{S-1} \|x_t - \hat{x}_t\|^2 \quad \text{[Equation 1]}$$

In Equation 1, S may represent the length of the sequence, $x_t$ may represent a CAN bus signal vector inputted to an encoder of the auto encoder at a specific time t, and $\hat{x}_t$ may represent a CAN bus signal vector outputted from a decoder of the auto encoder. That is, parameters constituting the auto encoder may be used to minimize and extract the MSE through an optimization algorithm such as RMSProp or ADAM.

So far, the method for extracting an MSE from a CAN bus signal through the auto encoder based on the LSTM has been described with reference to FIGS. 4 and 5. However, an MSE may be extracted from a CAN bus signal through an auto encoder based on a deep learning model such as an RNN or GRU.

Figure 6:
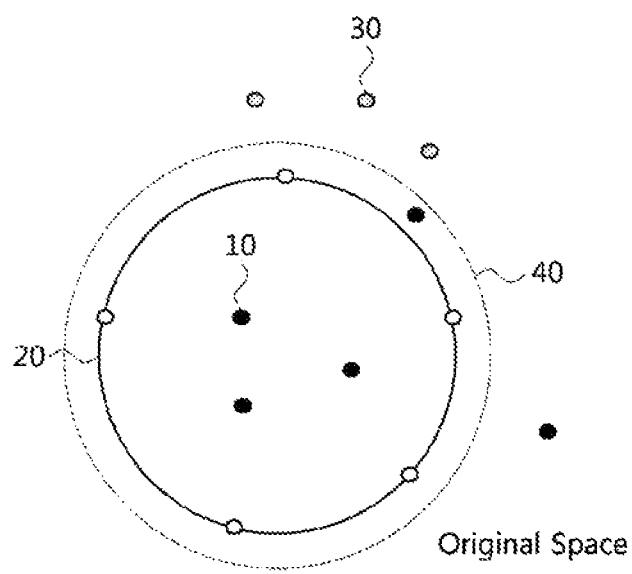
FIG. 6 is a diagram for describing an OC-SVM (One Class-Support Vector Machine) which is used to detect a driver's abnormalities.

FIG. 6 is a diagram illustrating an OC-SVM (One Class-Support Vector Machine) learning which is used to detect a driver's abnormalities.

In general, the SVM may indicate a machine learning algorithm having a hyperplane that separates data composed of two kinds of classes. The hyperplane may indicate a plane in an N-dimensional space, which separates the data of the classes, that is, a straight line that divides the classes in a two-dimensional space or a plane that divides the classes in a three-dimensional space. Therefore, the OC-SVM learning may indicate a machine learning algorithm for classifying only one class.

Referring to FIG. 6, the driver abnormality detection apparatus in accordance with the embodiment of the present disclosure may collect detection vectors in the original space by calculating MSEs of CAN bus signals in training data required for the OC-SVM learning, and vectorizing the MSEs. Then, the driver abnormality detection apparatus may perform OC-SVM learning based on the collected detection vectors of the MSEs.

Equation 2 is an equation for extracting a detection vector $y_t$ obtained by calculating and vectorizing MSEs for CAN bus signals in a specific time interval.

$$y_t = \frac{1}{S}\sum_{t'=0}^{S-1} (x_{t+t'} - \hat{x}_{t+t'})^2 \quad \text{[Equation 2]}$$

In Equation 2, S may represent the length of the sequence during a specific time interval, $x_t$ may represent a CAN bus signal vector inputted to an encoder of the auto encoder at a specific time t, and $\hat{x}_t$ may represent a recovered signal vector corresponding to the CAN bus signal vector $x_t$ recovered by a decoder of the auto encoder.

The detection vectors of the MSEs may include general vectors 10 and support vectors 20 and anomaly vectors 30 for classifying vectors that detect a driver. The anomaly vectors may indicate that a driver's state is abnormal (inoperable condition or vehicle theft). Furthermore, the support vectors may be all connected to form a hyperplane for classifying vectors that detect the driver.

The driver abnormality detection apparatus in accordance with the embodiment of the present disclosure may provide, as an SVM learning result, the hyperplane formed by connecting all of the support vectors and a determination boundary surface 40 for determining whether the driver's state is normal or abnormal (inoperable condition or vehicle theft). The determination boundary surface may include support vectors selected by the OC-SVM among the detection vectors. Furthermore, all of the detection vectors may not be located inside the determination boundary surface, but some of the detection vectors may be located outside the determination boundary surface even though they are detection vectors indicating that the driver's state is normal. However, according to parameter settings of the OC-SVM, all of the detection vectors indicating that the driver's state is normal may be controlled to be located inside the determination boundary surface.

So far, the method for detecting a driver's abnormalities based on the OC-SVM learning model has been described with reference to FIG. 6. However, a driver's abnormalities may also be detected through an abnormality detection model based on unsupervised learning, such as a random-forest learning model.

Figure 7:
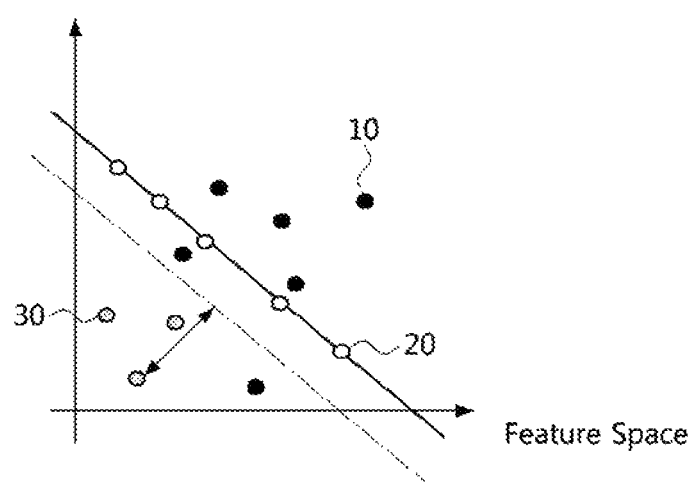
FIG. 7 is a diagram for describing the OC-SVM which is used to detect a driver's abnormalities.

FIG. 7 is a diagram for describing OC-SVM learning which is used to detect a driver's abnormalities.

Referring to FIG. 7, the driver abnormality detection apparatus in accordance with the embodiment of the present disclosure may collect detection vectors in a feature space by calculating MSEs of CAN bus signals in training data and vectorizing the MSEs. Then, the driver abnormality detection apparatus may perform OC-SVM learning based on the collected detection vectors of the MSEs.

In FIG. 7, anomaly vectors 30 may indicate detection vectors for determining whether a driver's state is abnormal (for example, inoperable condition or vehicle theft), and distances between the anomaly vectors 30 and a determination boundary surface 40 may be referred to as anomaly scores. Therefore, a user of the driver abnormality detection apparatus may set a reference score to detect a driver according to the anomaly scores.

The driver abnormality detection apparatus may extract an anomaly score for a predetermined time, and detect the driver's abnormality (for example, inoperable condition or vehicle theft) based on the number of times that the anomaly score exceeds a threshold (first threshold) related to the driver's abnormality (for example, inoperable condition or vehicle theft). When the number of times that the anomaly score exceeds the first threshold exceeds a reference number set by the user, the driver abnormality detection apparatus may detect the driver's abnormality (for example, inoperable condition or vehicle theft).

For example, when the vehicle is driven at a specific speed or more or the specific speed or less or when the vehicle is driven on a highway or in the downtown, the driver abnormality detection apparatus may extract an anomaly score for the predetermined time, and measure the number of times that the anomaly score exceeds the first threshold, in order to detect the driver's abnormality (for example, inoperable condition or vehicle theft). That is, the driver abnormality detection apparatus may differently set the first threshold related to the driver's abnormality (for example, inoperable condition or vehicle theft) depending on each situation, and measure the number of times that the anomaly score for each threshold exceeds the first threshold value, thereby detecting the driver's abnormality (inoperable condition or vehicle theft).

In addition to the method for detecting a driver's abnormality (inoperable condition or vehicle theft) by measuring the number of times that the anomaly score exceeds the first threshold, an additional detection method may be considered to improve the performance of the operation of detecting a driver's abnormality (inoperable condition or vehicle theft).

For example, when an anomaly score for a driver's driving characteristics at normal times is observed in a time-series manner, an anomaly score fluctuation over time may be not so large. However, when the anomaly score is observed in a time-series manner in the case that an unauthorized driver drives the vehicle, instead of the driver who drives the vehicle at normal times, or the driver is in an inoperable condition, an anomaly score fluctuation over time may be large even though the anomaly score does not exceed the first threshold.

Therefore, the driver abnormality detection apparatus may observe a fluctuation in anomaly score for the vehicle operation state over time, and determine that the driver is in an inoperable condition or a vehicle theft occurred, when the fluctuation exceeds a threshold (second threshold) related to a result obtained by observing an anomaly score for the driving characteristics of the driver, who drives the vehicle at normal times, in a time series manner.

In addition, various methods may be applied as the method for measuring a fluctuation in anomaly score over time. For example, a fluctuation in anomaly score over time may be measured in consideration of a log price difference used for observing a price fluctuation in a stock market or an oil exchange market.

Equation 3 is an equation for extracting a fluctuation in anomaly score over time in consideration of a log price difference.

$$r_t = |\log(a_t + C) - \log(a_{(t-L)} + C)|^2 \qquad \text{[Equation 3]}$$

In Equation 3, $a_t$ may represent an anomaly score obtained by extracting a detection vector $y_t$ through an unsupervised learning model such as the OC-SVM and a random forest learning model, C may represent a constant value for stabilizing the performance of the operation of detecting a driver's abnormality (for example, inoperable condition or vehicle theft), and L may represent the period in which the anomaly score is measured.

So far, the method for detecting a driver's abnormalities based on the OC-SVM learning model has been described with reference to FIG. 7. However, a driver's abnormalities may be detected through an abnormality detection model based on unsupervised learning, such as the random-forest learning model.

Figure 8:
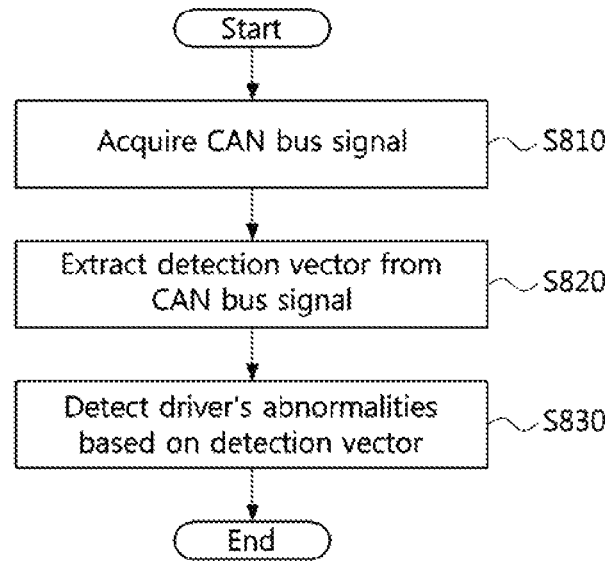
FIG. 8 is an operation flow chart illustrating a method for detecting a driver's abnormalities in accordance with an embodiment of the present disclosure.

FIG. 8 is a flow chart illustrating a method for detecting a driver's abnormalities in accordance with an embodiment of the present disclosure.

The method for detecting a driver's abnormalities (hereafter, referred to as the driver abnormality detection method) in accordance with the embodiment of the present disclosure, which detects a driver's abnormalities based on a CAN bus network that communicates with an ECU of a vehicle, may include step S810 of acquiring a CAN bus signal related to operation of the vehicle from the CAN bus network.

The driver abnormality detection method in accordance with the embodiment of the present disclosure may include step S820 of extracting a detection vector from the CAN bus signal using an auto encoder.

The auto encoder may include deep learning models such as an LSTM, RNN and GRU.

The detection vector may be extracted through an MSE calculated for each CAN bus signal by the auto encoder.

The MSE may be minimized by adjusting parameters constituting the auto encoder.

The driver abnormality detection method in accordance with the embodiment of the present disclosure may include step S830 of detecting a driver's abnormality based on the detection vector.

The step of detecting the driver's abnormality based on the detection vector may include detecting the driver's abnormality through an abnormality detection model based on unsupervised learning.

The step of detecting the driver's abnormality through the abnormality detection model based on the unsupervised learning may include detecting the driver's abnormality by extracting an anomaly score for a predetermined time.

The step of detecting the driver's abnormality by extracting the anomaly score for the predetermined time may include detecting the driver's abnormality based on the number of times that the anomaly score exceeds a first threshold related to the driver's abnormality for the predetermined time.

Furthermore, the step of detecting the driver's abnormality by extracting the anomaly score for the predetermined time may include detecting the driver's abnormality by measuring a fluctuation in anomaly score over time, which exceeds a second threshold related to the driver's abnormality for the predetermined time.

Figure 9:
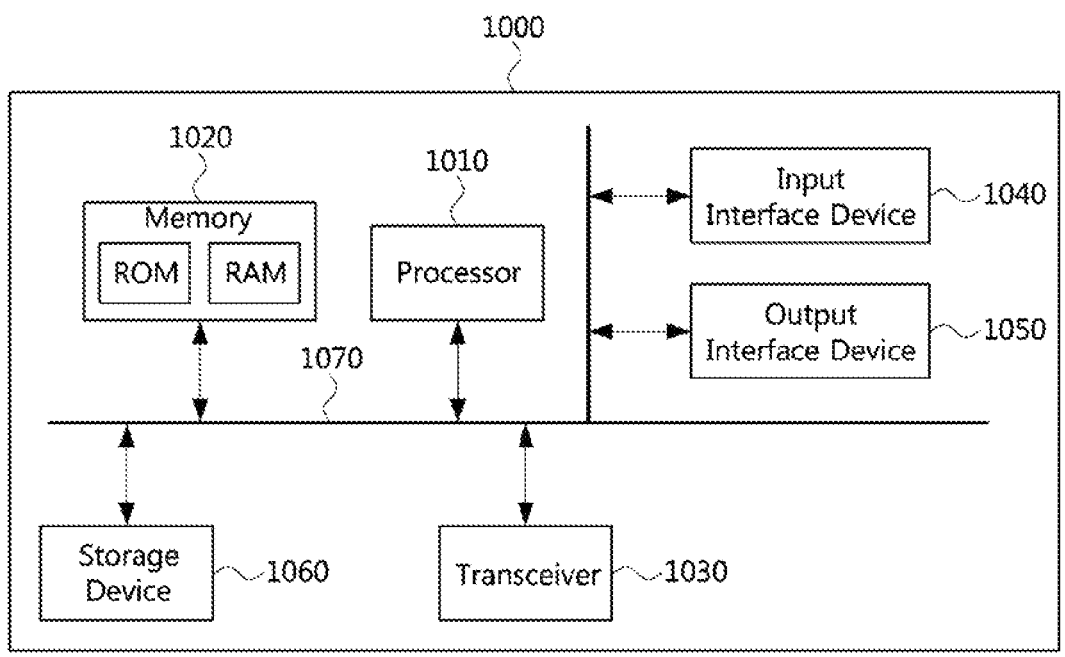
FIG. 9 is a block configuration diagram illustrating the apparatus for detecting a driver's abnormalities in accordance with the embodiment of the present disclosure.

FIG. 9 is a block diagram illustrating the driver abnormality detection apparatus in accordance with the embodiment of the present disclosure.

The driver abnormality detection apparatus 1000 in accordance with the embodiment of the present disclosure may include at least one processor 1010, a memory 1020 configured to store one or more commands executed through the processor, and a transceiver 1030 connected to a network to perform communication.

The driver abnormality detection apparatus 1000 may further include an input interface device 1040, an output interface device 1050, a storage device 1060 and the like. The components included in the driver abnormality detection apparatus 1000 may be connected through a bus 1070 to communicate with one another.

The processor 1010 may execute a program command stored in at least one of the memory 1020 and the storage device 1060. The processor 1010 may indicate a CPU (Central Processing Unit), a GPU (Graphics Processing Unit) or a dedicated processor configured to perform the methods in accordance with the embodiments of the present disclosure. Each of the memory 1020 and the storage device 1060 may be configured as at least one of a volatile storage medium and a nonvolatile storage medium. For example, the memory 1020 may be configured as at least one of a ROM (Read Only Memory) and a RAM (Random Access Memory).

The storage device 1060 may store an MSE calculated through an auto encoder, and store an OS-SVM learning result and a random forest learning result.

The one or more commands may include: a command for controlling the driver abnormality detection apparatus to acquire a CAN bus signal related to operation of the vehicle from the CAN bus network; a command for controlling the driver abnormality detection apparatus to extract a detection vector from the CAN bus signal using the auto encoder; and a command for controlling the driver abnormality detection apparatus to detect a driver's abnormality based on the detection vector.

The auto encoder may include deep learning models such as an LSTM, RNN and GRU.

The detection vector may be extracted through an MSE calculated for each CAN bus signal by the auto encoder.

The MSE may be minimized by adjusting parameters constituting the auto encoder.

The command for controlling the driver abnormality detection apparatus to detect a driver's abnormality based on the detection vector may include a command for controlling the driver abnormality detection apparatus to detect a driver's abnormality through an abnormality detection model based on unsupervised learning.

The command for controlling the driver abnormality detection apparatus to detect the driver's abnormality through the abnormality detection model based on the unsupervised learning may include a command for controlling the driver abnormality detection apparatus to detect the driver's abnormality by extracting an anomaly score for a predetermined time.

The command for controlling the driver abnormality detection apparatus to detect the driver's abnormality by extracting the anomaly score for the predetermined time may include a command for controlling the driver abnormality detection apparatus to detect the driver's abnormality based on the number of times that the anomaly score exceeds a first threshold related to the driver's abnormality for the predetermined time.

Furthermore, the command for controlling the driver abnormality detection apparatus to detect the driver's abnormality by extracting the anomaly score for the predetermined time may include a command for controlling the driver abnormality detection apparatus to detect the driver's abnormality by measuring a fluctuation in anomaly score over time, which exceeds a second threshold related to the driver's abnormality for the predetermined time.

The operations of the method according to the embodiment of the present disclosure can be implemented as a computer readable program or code in a computer readable recording medium. The computer readable recording medium may include all kinds of recording devices for storing data which can be read by a computer system. Furthermore, the computer readable recording medium may store and execute programs or codes which can be distributed in computer systems connected through a network and read through computers in a distributed manner.

The computer readable recording medium may include a hardware device which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or devices may correspond to the steps of the method or the features of the steps. Similarly, the aspects described in the context of the method may be expressed as the features of the corresponding blocks or items or the corresponding devices. Some or all of the steps of the method may be executed by (or using) a hardware device such as a microprocessor, a programmable computer or an electronic circuit. In some embodiments, one or more of the most important steps of the method may be executed by such a device.

Although the present disclosure has been described with reference to preferred embodiments, it will be apparent to those skilled in the art that the present disclosure may be variously changed and modified without departing from the spirit and scope of the invention defined in the following claims.

What is claimed is:

1. A method for detecting a driver's abnormalities based on a Controller Area Network (CAN) bus network communicating with an Electronic Control Unit (ECU) of a vehicle, the method comprising:
   acquiring, by the CAN bus signal extractor of the ECU, CAN bus signals related to an operation of the vehicle from the CAN bus network;
   extracting, by an auto encoder of the ECU, detection vectors from the CAN bus signals, the detection vectors including general vectors, supports vectors and anomaly vectors, wherein the detection vectors are extracted through an Mean Square Error (MSE) calculated for each of CAN bus signal vectors inputted to encoders of the auto encoder at a specific time and each of CAN bus signal vectors outputted from decoders of the auto encoder of an immediate previous time, and where a hyperplane is formed by connecting the support vectors; and
   detecting, by the ECU, a driver's abnormality based on anomaly scores indicated as distances on the hyperplane between the anomaly vectors and a determination boundary surface which includes support vectors selected by a one class-support vector machine (OC-SVM) learning among the detection vectors.

2. The method of claim 1, wherein the MSE is minimized by adjusting parameters constituting the auto encoder, the encoders and the decoders including long short term memory (LSTM) layers and a fully connected layer, respectively.

3. The method of claim 1, wherein the detecting of the driver's abnormality comprises detecting the driver's abnormality through an abnormality detection model based on unsupervised learning.

4. The method of claim 3, wherein the detecting of the driver's abnormality through the abnormality detection model based on the unsupervised learning comprises detecting the driver's abnormality by extracting the anomaly score for a predetermined time.

5. The method of claim 4, wherein the detecting of the driver's abnormality by extracting the anomaly score for the predetermined time comprises detecting the driver's abnormality based on the number of times that the anomaly score exceeds a first threshold related to the driver's abnormality for the predetermined time.

6. The method of claim 4, wherein the detecting of the driver's abnormality by extracting the anomaly score for the predetermined time comprises detecting the driver's abnormality by measuring a fluctuation in anomaly score over time, which exceeds a second threshold related to the driver's abnormality, for the predetermined time.

7. An apparatus for detecting a driver's abnormalities based on a Controller Area Network (CAN) bus network communicating with an Electronic Control Unit (ECU) of a vehicle, the apparatus comprising:
- a processor; and
- a memory configured to store one or more commands executed through the processor,
- wherein when the processor performs a function of a CAN bus signal extractor and a function of an auto encoder by the one or more commands,
- the CAN bus signal extractor acquires CAN bus signals related to an operation of the vehicle from the CAN bus network;
- the auto encoder extracts detection vectors from the CAN bus signals, the detection vectors including general vectors, supports vectors and anomaly vectors, wherein the detection vectors are extracted through an Mean Square Error (MSE) calculated for each of CAN bus signal vectors outputted from decoders of the auto encoder at a n immediate previous time, and where a hyperplane is formed by connecting the support vectors; and
- the processor detects a driver's abnormality based on anomaly scores indicated as distances on the hyperplane between the anomaly vectors and a determination boundary surface which includes support vectors selected by an one class-support vector machine (OC-SVM) learning among the detection vectors.

8. The apparatus of claim 7, wherein the MSE is minimized by adjusting parameters constituting the auto encoder, the encoders and the decoders including long short term memory (LSTM) layers and a fully connected layer, respectively.

9. The apparatus of claim 7, wherein the processor detects the driver's abnormality through an abnormality detection model based on unsupervised learning, wherein the encoders and the decoders including long short term memory (LSTM) layers and a fully connected layer, respectively.

10. The apparatus of claim 9, wherein the processor detects the driver's abnormality by extracting the anomaly score for a predetermined time.

11. The apparatus of claim 10, wherein the processor detects the driver's abnormality based on the number of times that the anomaly score exceeds a first threshold related to the driver's abnormality for the predetermined time.

12. The apparatus of claim 10, wherein the processor detects the driver's abnormality by measuring a fluctuation in anomaly score over time, which exceeds a second threshold related to the driver's abnormality, for the predetermined time.

* * * * *